(12) United States Patent
Lee

(10) Patent No.: US 7,002,750 B2
(45) Date of Patent: Feb. 21, 2006

(54) IMAGE CAPTURING DEVICE

(76) Inventor: Ann-Lun Lee, 3F, No. 10, Lane 70, Wuyii St., Linya Chu, Kaohsiung (TW)

( * ) Notice: Subject to any disclaimer, the term of this patent is extended or adjusted under 35 U.S.C. 154(b) by 0 days.

(21) Appl. No.: 10/605,921

(22) Filed: Nov. 6, 2003

(65) Prior Publication Data
US 2005/0099694 A1    May 12, 2005

(51) Int. Cl.
G02B 27/10 (2006.01)
(52) U.S. Cl. .................. 359/626; 359/619; 359/625
(58) Field of Classification Search ............... 359/619, 359/625, 626; 235/454; 358/509
See application file for complete search history.

(56) References Cited

U.S. PATENT DOCUMENTS

| 4,725,138 A | * | 2/1988 | Wirth et al. | ................ 356/121 |
| 6,679,964 B1 | * | 1/2004 | Lee et al. | ................ 156/182 |
| 2002/0135825 A1 | * | 9/2002 | Lee et al. | ................ 358/509 |
| 2004/0056098 A1 | * | 3/2004 | Tanaami et al. | ............ 235/454 |

* cited by examiner

Primary Examiner—Ricky L. Mack
(74) Attorney, Agent, or Firm—Berkeley Law & Technology Group, LLC

(57) ABSTRACT

A scanning module for scanning a document is provided. The scanning module comprises: a chassis; a light source on the chassis for emitting a light ray onto the document; a plurality of reflectors inside the chassis; a lens inside the chassis; an image sensing device inside the chassis, an image of the document being reflected by the plurality of reflectors and formed on the image sensing device, the image sensing device including a plurality of sensing cells; and a plurality of microlenses on the plurality of sensing cells, each of the plurality of microlenses having a top surface and a bottom surface, the top surface having a plurality of notches as an input window for changing an incident angle of the light ray, the bottom surface having a plurality of round curves as an output window for further focusing the light ray.

12 Claims, 3 Drawing Sheets

IMAGE CAPTURING DEVICE

BACKGROUND OF INVENTION

1. Field of the Invention

This invention generally relates to an image sensing device, and more particularly to an image sensing device with microlenses.

2. Description of Related Art

Recently, because data processing speed and data storage capacity are greatly improved in an image capturing chip, the performance in graphic processing has been enhanced dramatically. Hence, image processing devices such as scanners, digital cameras, and digital camcorders become indispensable in our daily life. Further, those devices become smaller and smaller for our convenience.

Generally, an optical scanner includes a light source on the chassis of the scanning module. The scanning module includes a set of reflectors, a lens and an image sensing device inside the chassis. The scanning module can scan documents one-on-one by linear transmission mechanism. Further, when a light source emits a light to the document, the image of the document can be formed on the image sensing device by focusing via the lens and reflecting via the reflectors. The image sensing device can be a charge-coupled device (CCD) or a CMOS device.

FIG. 1 is the side view of the scanning module of a conventional optical scanner. FIG. 2 shows the light path in the conventional scanning module. Referring to FIG. 1, the scanning module 100 includes a chassis 110, a light source 112, a plurality of reflectors 114, 116, and 118, a lens 120, and an image sensing device 122. The light source 112 can be a fluorescent lamp or an LED array on the top surface of the chassis 110. The light source 112 emits a light to a scan-pending document. The reflectors 114, 116, and 118, the lens 120, and the image sensing device 122 are inside the chassis 110. When the light source 112 emits the light to the document, the image of the document is formed on the image sensing device 122 by focusing via the lens 120 and reflecting via the reflectors 114, 116, and 118. Referring to FIG. 2, the distance S1 between the document 10 and the lens 120 is the so-called object distance, while the distance S2 between the lens 120 and the image sensing device 122 is the so-called image distance. The amount of S1 and S2 is the so-called total trace TT. The image of the document 10 is reflected by the reflectors 114, 116, and 118 to project a light cone on the lens 120. Then the lens 120 focuses the image to form another light cone on the image sensing device 122.

It should be noted that the image sensing device includes a plurality of linear sensing cells (or sensing chips) 124, 126. Each sensing cell represents a pixel. Hence, the more number of the sensing cells, the higher the resolution of the image sensing device per unit area. However, when the resolution is higher, the required luminous flux has to be increased in order to obtain a sharper image. The conventional way is to apply a plurality of microlenses 134 and 136 on each sensing cell 124 and 126 to further focus the image in order to increase the luminous flux.

FIG. 2A is an enlarged view illustrating how the incident lights enter into the microlenses. Because the sensing cells 124 and 126 are linearly arranged and the outer area of the sensing cell 126 has a longer light path than the central area of the sensing cell 124, the incident light cannot enter into the microlens 136 at the outer area perpendicularly. Instead, the incident light enters into the microlens 136 at an incident angle. When the incident angle is larger than or equal to the total reflection angle, a portion of lights is totally reflected at the surface of the microlens 136 or be deflected, and thus cannot enter into the sensing cell 126. Therefore, there is an insufficient luminous flux at the edge of the image. Further, after the incident light is further focused by the microlens 136, the luminous flux projected into the sensing cell 136 increases. However, the light may shift slightly to affect the quality of the image. When the image distance S2 between the lens 120 and the image sensing device 122 is getting smaller, the possibility to total reflection at the two sides of the image sensing device 122 would become higher, which causes a serious image distortion to the image signal of the document 10.

SUMMARY OF INVENTION

An object of the present invention is to provide a scanning module to improve the quality of the output signal of the image sensing device and to increase the luminous flux.

The present invention provides a scanning module for scanning a document, comprising: a chassis; a light source on the chassis for emitting a light ray on the document; a plurality of reflectors inside the chassis; a lens inside the chassis; an image sensing device inside the chassis, an image of the document being reflected by the plurality of reflectors and formed on the image sensing device, the image sensing device including a plurality of sensing cells; and a plurality of microlenses on the plurality of sensing cells, each of the plurality of microlenses having a top surface and a bottom surface, the top surface having a plurality of notches as an input window for changing an incident angle of the light ray, the bottom surface having a plurality of round curves as an output window for further focusing the light ray.

In a preferred embodiment of the present invention, each of the plurality of notches may have a same slope or a different slope, and the slopes decrease gradually from an outermost notch to an innermost notch.

The present invention uses the non-semicircular microlenses to guide the incident lights to enter into the microlenses in an almost perpendicular manner. The lights are focused via the surface of the microlenses to increase the luminous flux projected onto the sensing cells. The image quality is thus improved.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
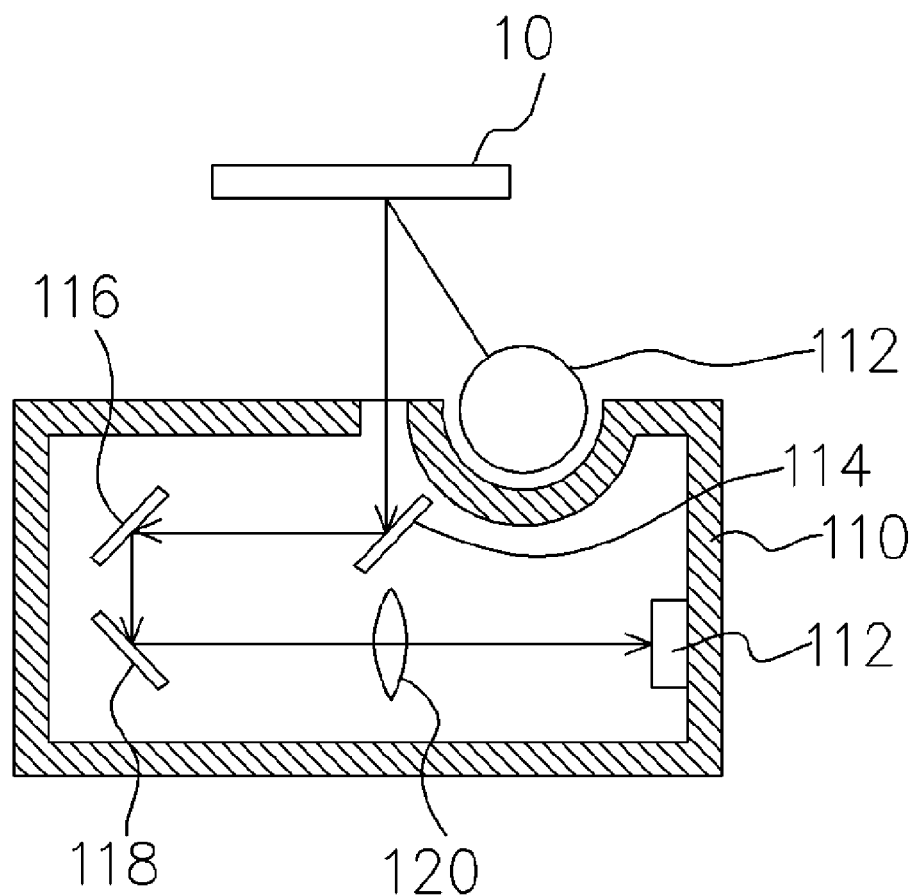
FIG. 1 is a schematic diagram of a side view of a scanning module of a conventional optical scanner.
Figure 2:
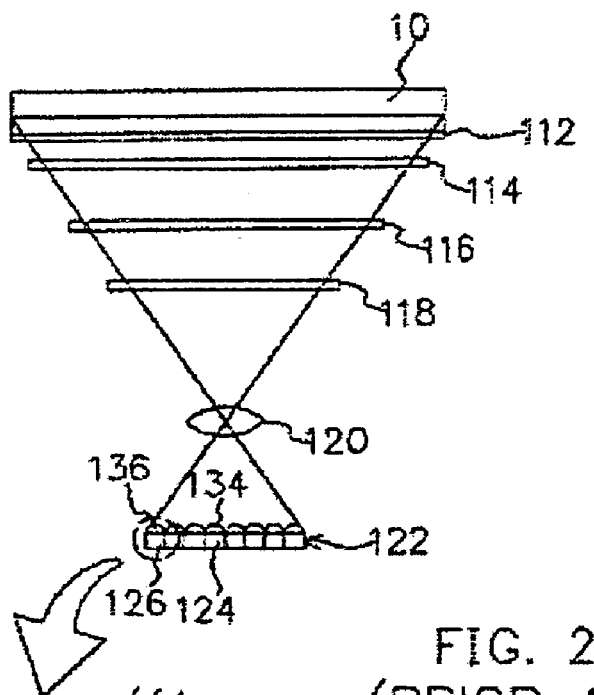
FIG. 2 shows the light path in the conventional scanning module.
Figure 2A:
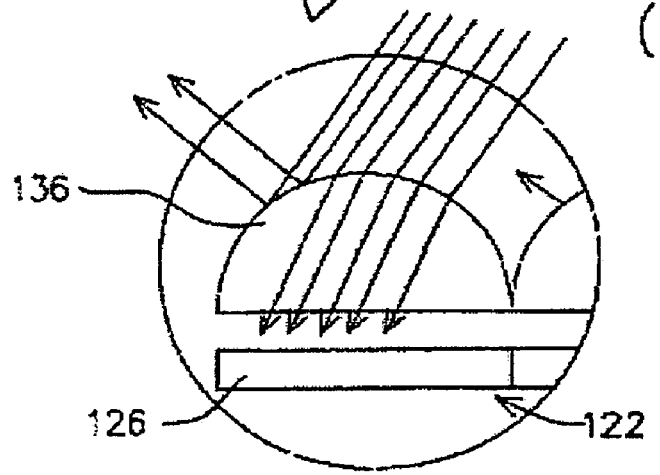
FIG. 2A is an enlarged view illustrating how the incident lights of FIG. 2 enter into the microlenses.
Figure 3:
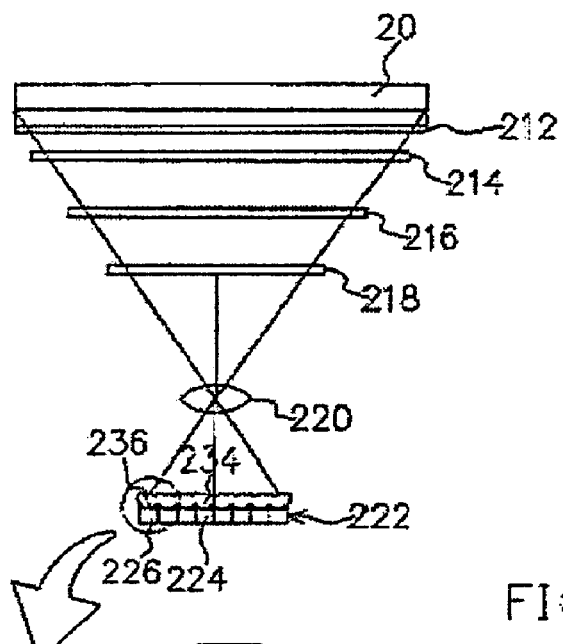
FIG. 3 shows the light path in the image capturing device in accordance with an embodiment of the present invention.

FIG. 3 shows the light path in the image capturing device in accordance with an embodiment of the present invention.

The image capturing device includes an optical image formation structure comprising at least a lens and an image sensing device. The image sensing device is disposed on the light axis of the lens. The image sensing device can be a CCD device or a CMOS chip. In addition, the optical image formation structure further includes a light source and a plurality of reflectors inside the chassis of the scanning module. In this embodiment, the scanning module of the optical scanner is used for the purpose of illustration. However, the present invention also can apply to other image capturing devices such as digital cameras and digital camcorders.

Referring to FIG. 3, the scanning module comprises a chassis (not shown), a light source 212, a plurality of reflectors 214, 216, 218, a lens 220, and an image sensing device 222. The light source 212 can be a fluorescent lamp or an LED array on the top surface of the chassis. The light source 212 emits the light to the scan-pending document 20. The reflectors 214, 216, and 218, the lens 220, and the image sensing device 222 are inside the chassis. When the light source 212 emits the light on the document 20, the image of the document 20 can be formed on the image sensing device 222 by focusing via the lens 120 and reflecting via the reflectors 214, 216, and 218.

It should be noted that in the scanning module, the image scanning device 222 includes 3 columns of sensing cells (FIG. 3 only shows one column of sensing cells 224 and 226). The light ray projected onto the image sensing device is represented by red light R, green light G, and blue light B, which are projected onto the corresponding columns of sensing cells respectively to obtain the corresponding light intensity of the red light R, green light G, and blue light B. The intensities of the red light R, green light G, and blue light B are converted into the output analog signals. Each of the sensing cells represents a pixel. A column of sensing cells divides the image of the document 20 into several pixels. The sensing cell 224 located at the central area receives the light ray that is basically perpendicular to the light axis of the lens 220. The farther the sensing cell 226 is located at the area away from the central area, the larger is the incident angle of the light ray entering into the sensing cell 226. To prevent a total reflection due to the incident angle larger than the total reflection angle, non-semicircle microlenses 234 and 236 are used on each of the sensing cells 224 and 226 or at the two sides of the sensing cell 226 in this embodiment, in order to increase the luminous flux projected onto the sensing cells, which improves the image quality.

Figure 3A:
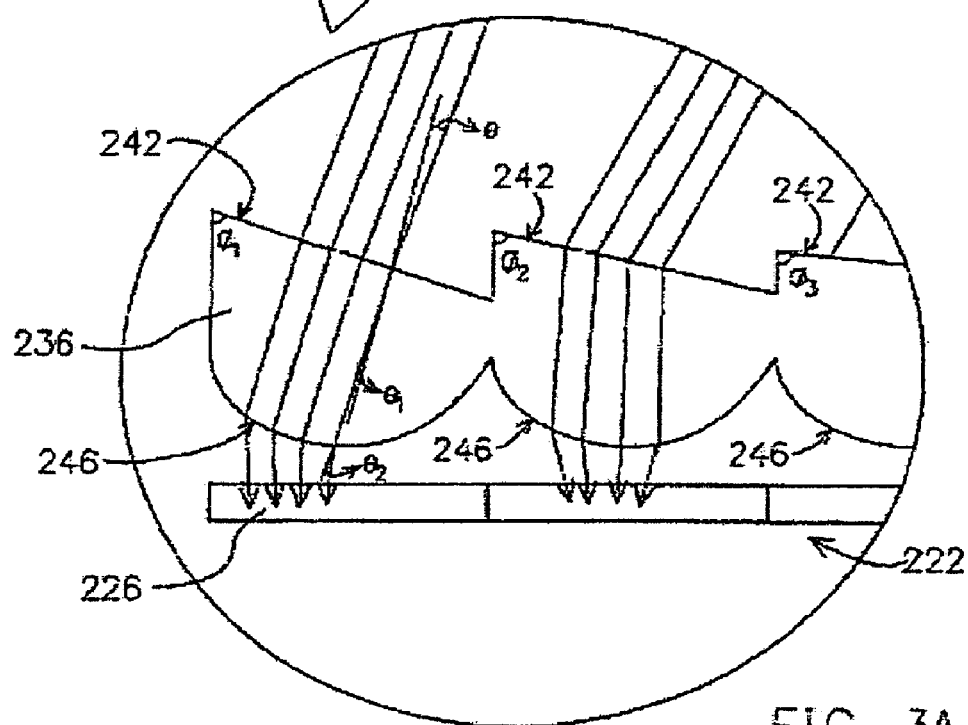
FIG. 3A is a schematic diagram illustrating how the incident lights of FIG. 3 enter into the microlenses in accordance with the embodiment of the present invention.

FIG. 3A is a schematic diagram illustrating how the incident lights of FIG. 3 enter into the microlenses in accordance with the embodiment of the present invention. The microlens 236 is located directly above the sensing cell 226. The material of the microlens 236 can be the polymer or other transparent organic materials. The top surfaces of the microlenses 234 and 236 include a plurality of notches 242 as the input windows of the incident light ray. Each of the plurality of notches 242 can have a same slope or a different slope to change the incident angle of the light ray. The bottom surfaces of the microlenses 234 and 236 include a plurality of round curves 246 as an output window for further focusing the light ray.

Referring to FIG. 3A, when the light ray enters the top surface of the microlens 236 at an incident angle, according to the law of refraction, if the incident angle θ is larger or equal to the total reflection angle, the total reflection will occur. Otherwise, when the light ray enters the top surface of the microlens at an incident angle θ smaller than the total reflection angle, the total reflection will not occur. In this embodiment, a plurality of notches 242 are used as the input windows for the microlenses 234 and 236, so that the incident angle at the surface of the notches 242 is smaller than the total reflection angle. Hence, the light ray with the first refracting angle $\theta 1(\theta 1<\theta)$ enters into the surface of the notches 242. Then the round surfaces (such as semicircle surfaces) are used as the output windows for the microlenses 234 and 236. Further, the light ray with the second refracting angle $\theta 1(\theta 1<\theta)$ exits form the round surfaces. Finally the light ray is projected onto the sensing cell 226. The light ray, after being twice refracted, is almost perpendicular when entering into the sensing cell 226. In addition, the light ray will not shift as in the conventional scanning module. Hence, the image quality is improved and the luminous flux increases in accordance to the invention.

Referring to FIG. 3, the top surfaces of the microlenses 234 and 236 are connected together to form a series of notches. Because both the microlenses and the sensing cells are linearly arranged, the incident angles at the microlenses 234 and 236 are different. Further, the slope of each notch 242 is different, wherein the slope at the central area is lower than that at the side area (as shown in FIG. 3A), and the slope decreases gradually from the outermost notch 242 through the innermost notch 242 ($\phi 1<\phi 2<\phi 3$). Further, since the light ray can enter perpendicularly into the microlens 224 at the central area, the top surface of the microlens 224 at the central area can be a flat surface. For example, the slope of the notch at the central area is close to zero ($\phi=90°$).

In summary, the image capturing device of the present invention, such as, a scanning module, digital camera, digital camcorder, etc, at least includes a lens and an image sensing device, and each of the sensing cells of the image sensing device has a microlens to increase the luminous flux. When the light ray enters into the top surface of the microlens, the slope of the notch can change the incident angle of the light ray to prevent a total reflection or a deflection. When the light ray exits from the bottom surface, the round surfaces of the microlens can further focus the light ray in order to improve the image quality.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. An image capturing device for capturing a light ray, comprising:
   a lens having a light axis;
   an image sensing device on said light axis, said light ray being focused by said lens to be projected onto said image sensing device, said image sensing device including a plurality of sensing cells; and
   a plurality of microlenses on said plurality of sensing cells, wherein at least one of said plurality of microlenses has a top surface and a bottom surface, said top surface having one or more notches as an input window for changing an incident angle of said light ray, said bottom surface having one or more round curves as an output window for further focusing said light ray.

2. The device of claim 1, and further comprising at least two notches, wherein at least a portion of said at least two notches have a same slope.

3. The device of claim 1, and further comprising at least two notches, wherein at least a portion of said at least two notches have a different slope, and said slopes decrease gradually from an outermost notch to an innermost notch.

4. The device of claim 1, wherein at least one of said one or more round curves has a semicircle cross-section.

5. The device of claim 1, wherein said image sensing device comprises a charge-coupled device.

6. The device of claim 1, wherein said image sensing device comprises a CMOS device.

7. A scanning module for scanning a document, comprising:
- a chassis:
- a light source on said chassis for emitting a light ray on said document;
- a plurality of reflectors inside said chassis;
- a lens inside said chassis;
- an image sensing device inside said chassis, an image of said document being reflected by said plurality of reflectors and formed on said image sensing device, said image sensing device including a plurality of sensing cells; and
- a plurality of microlenses on said plurality of sensing cells, wherein at least one of said plurality of microlenses has a top surface and a bottom surface, said top surface having one or more notches as an input window for changing an incident angle of said light ray, said bottom surface having one or more round curves as an output window for further focusing said light ray.

8. The device of claim 7, and further comprising at least two notches, wherein at least a portion of said at least two notches have a same slope.

9. The device of claim 7, and further comprising at least two notches, wherein at least a portion of said at least two notches have a different slope, and said slopes decrease gradually from an outermost notch to an innermost notch.

10. The device of claim 7, wherein at least one of said one or more round curves has a semicircle cross section.

11. The device of claim 7, wherein said image sensing device comprises a charge-coupled device.

12. The device of claim 7, wherein said image sensing device comprises a CMOS device.

\* \* \* \* \*